United States Patent Office 2,985,421
Patented May 23, 1961

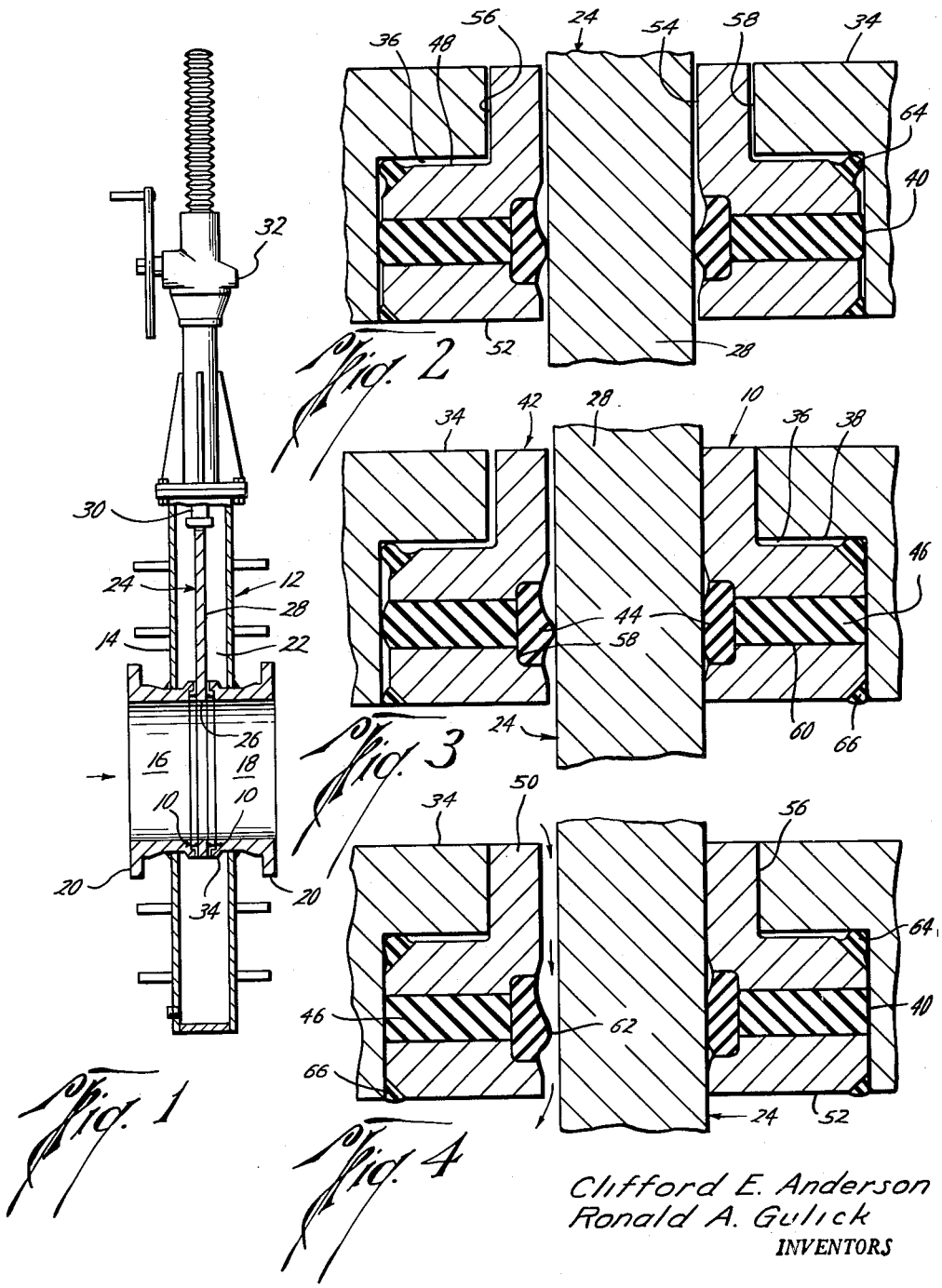

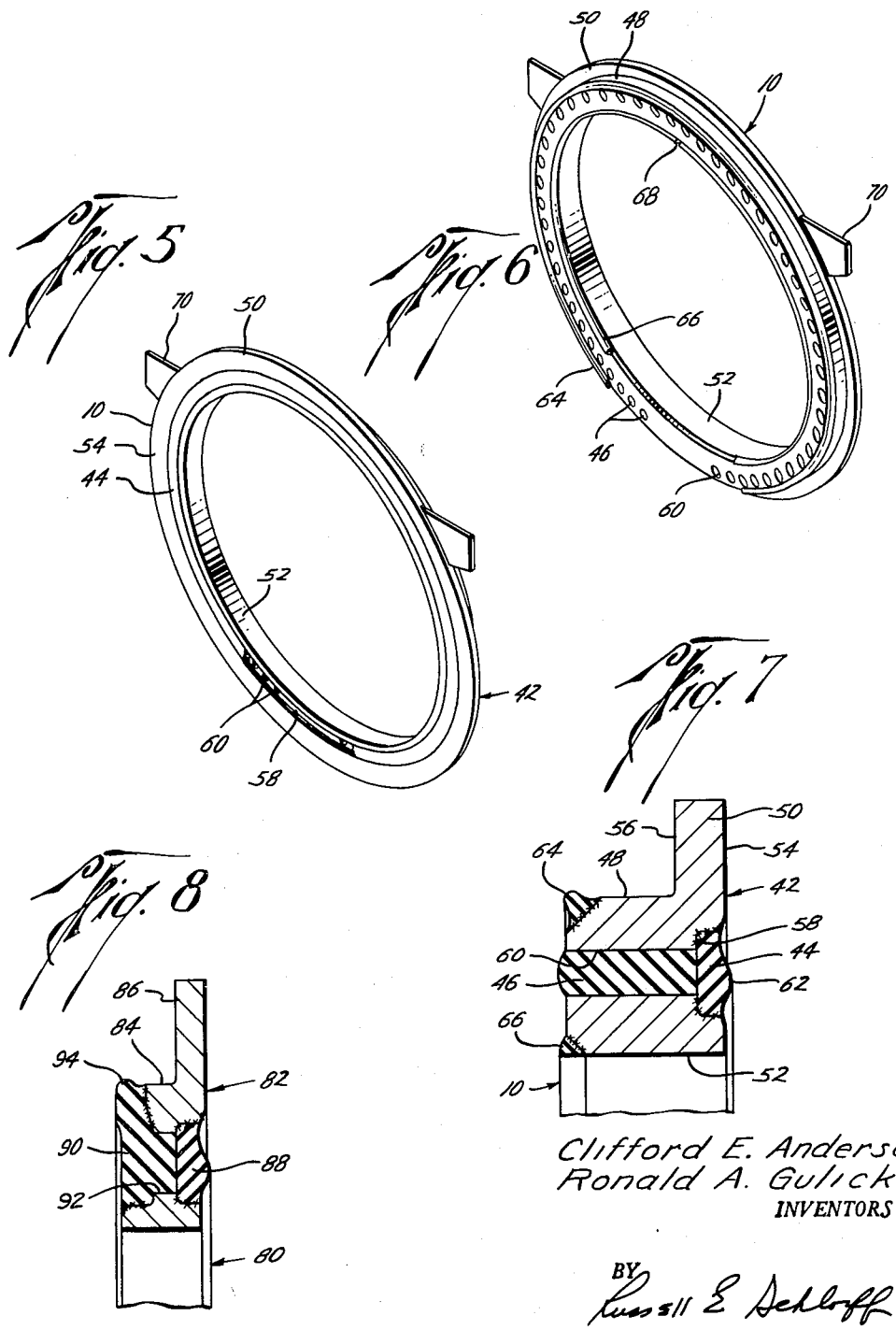

2,985,421

PRESSURE ACTIVATED SEALING MEMBERS

Clifford E. Anderson and Ronald A. Gulick, Houston, Tex., assignors to ACF Industries, Incorporated, New York, N.Y., a corporation of New Jersey Filed Mar. 7, 1960, Ser. No. 13,150

12 Claims. (Cl. 251—172)

This invention relates generally to valves and more particularly to a valve having improved pressure-activated sealing members.

This application is a continuation in part of our co-pending application Serial No. 693,399, filed October 30, 1957. In the above-entitled application, there is fully disclosed a valve having improved pressure-activated sealing members. Each sealing member is comprised of a stamped metal structural member having two masses of resilient material bonded thereto. The mass on the face of the sealing member is relatively hard and abrasive resistant thereby long wearing; whereas the mass of material on the back of the member is soft and pliable thereby flowable and easy to seal. The structural member is provided with numerous passages so that the resilient material on the back of the member can be utilized to rejuvenate the face material. This sealing member has been used most successfully in valves with pressure ratings up to ASA 300 pound class (720 p.s.i. working pressure) and up to 12 inches in size. While the stamped structural member has no size limitations, in the larger sizes—above 12 inches—the metal stamping is difficult to form and the die members required are relatively expensive. Since the quantity of larger size valves is fairly small, the expense for dies for slow selling sizes may be economically unfeasible. Also, in higher pressure valves, particularly the larger sizes, a high strength structural member is required to withstand the high loads on the larger span of exposed area which occurs during operation. Moreover, in certain services a supplementary metal-to-metal seal, in addition to the resilient seal provided by the sealing member, is highly desirable. Accordingly, the present invention is directed to a pressure-activated sealing member having a high strength structural member formed from a casting or a forging which will perform all of the desirable sealing functions accomplished by the sealing member in our co-pending application, such as, small initial interference to aid assembly, self-compensating for wear, upstream and downstream seals, relief of excessive body pressure, and will also carry the loads developed by the larger high pressure valves. The seat of the present invention will also provide a metal-to-metal seal so that, in the event the primary seal formed by the resilient material is destroyed, the valve will still seal. Additionally, the bore of the present sealing member is part of the structural member and affords an intimate contact with the gate which provides additional protection for the resilient material against any deleterious matter in the lading. Moreover, the present sealing member is provided with an annular ring of resilient material which will prevent sediment in the lading from falling into the area between the axial outward wall of the sealing member and the wall of its pocket.

It is the primary object of the present invention to provide an improved pressure-activated sealing member which will withstand relatively high pressure.

It is a general object to provide an improved high strength pressure-activated sealing member for a valve which will be self-compensating for wear.

It is another object to provide an economical high strength structural member for a pressure-activated sealing member.

It is another object to provide a floating resilient sealing member which is provided with means to prevent sediment from being deposited between the axially outward wall of the sealing member and the wall of the pocket.

It is another object to provide an improved high strength pressure-activated sealing member for a valve which will seal both upstream and downstream.

It is another object to provide a high strength pressure-activated sealing member which permits the body pressure to be bled off and bonnet removed from a pressurized valve in either the completely open or closed position.

It is a further object to provide an improved high strength pressure-activated sealing member for a valve so constructed that excessive body pressure will be relieved into the upstream passage.

It is still a further object to provide an improved high strength pressure-activated sealing member for a valve which will have small initial face contact and is easy to assemble.

It is still a further object to provide a pressure-activated resilient sealing member having a supplementary metal-to-metal seal.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein:

Fig. 1 is an elevational view in section of a gate valve embodying the improved pressure-activated sealing members of the present invention.

Fig. 2 is a diagrammatic view of the gate and sealing members illustrating the interference seals formed by the sealing members.

Fig. 3 is a view similar ot Fig. 2 showing the seals established when upstream pressure is equal to body and greater than the downstream pressure.

Fig. 4 is a view similar to Fig. 2 showing the upstream sealing member relieving excessive body pressure.

Fig. 5 is a perspective of the front face of the sealing member shown in Fig. 1, part of the resilient material being broken away to show details of construction.

Fig. 6 is a perspective view of the rear face of the sealing member shown in Fig. 5.

Fig. 7 is an enlarged cross sectional view of the sealing member shown in Fig. 1.

Fig. 8 is a view similar to Fig. 7 of an alternate form of sealing member.

Referring now to the drawings, Fig. 1 shows improved pressure-activated seal members 10—10 of the present invention incorporated in a through-conduit gate valve 12. The gate valve 12 has a body 14 provided with aligned flow passages 16 and 18. The outer ends of the passages 16 and 18 are shown terminating in flanges 20—20 permitting the valve to be connected to a flow system. Naturally, any other of the various well-known means of finishing ends for the connection of a valve to a flow system may be utilized.

Interposed between the flow passages 16 and 18 there is a valve chamber 22 in which is positioned a reciprocating valve member or gate 24. The valve member 24 consists of a substantially flat metal plate having a passage 26 adapted to register with the passages 16 and 18 in valve open position, the position shown in Fig. 1, and a solid portion 28 to cover the passages 16 and 18 in the valve closed position, the position shown in Figs. 2, 3 and 4. The passage 26 in registering with the passages 16 and 18 forms a through passage for the lading flowing through the valve and minimizes turbulence. The upper end of the gate 24 is attached to means, such as the stem 30, for raising and lowering the gate 24. As is well-known in the art, a bonnet closes the valve chamber 22 and the stem 30 extends through a sealed passage in the bonnet. To move the stem 30, the upper end of the stem 30 may be provided with a bevel gear operator 32 or any of the various types of operators well-known in the art.

The valve chamber end of the flow passages 16 and 18 terminates in hub portions 34—34 which extend into the valve chamber 22. The hub portions 34—34 are machined to form seat pockets 36—36. Each seat pocket 36 is formed concentrically with its flow passage and has one side open to such passage. Each pocket 36 has a cylindrical wall 38 coaxial with and spaced from the passage and an axial outward wall 40 which intersects the passage. Each pocket 36 is proportioned to receive its sealing member 10.

Each sealing member 10 is comprised of a structural member 42 and two masses 44 and 46 of resilient material. The structural member 38 may be made from ductile iron, bronze, steel, or other suitable high strength material. It may be machined from a casting or forging. The structural member 42 is generally annular in shape and has a generally cylindrical hub portion 48 and an annular flange portion 50 encircling one end of the hub portion 48. The cylindrical portion 48 is provided with a passage 52 which forms a portion of the run of the valve in the open position. The outer diameter of the hub portion 48 is adapted to telescopically fit within the cylindrical wall 38 of the seat pocket 36. Since the sealing member 10 is a pressure-activated sealing member and will move in response to pressure, the fit between the outer diameter of the hub 48 and the cylindrical wall 38 of the seat pocket 34 may be fairly loose. The annular flange portion 50 acts as the bearing surface for the sealing member 10 and receives and retains the force exerted by the upstream pressure acting through the gate 24. If desired, the annular flange portion 50 may have its sealing face 54, the face opposing the gate 24, finished to a high degree of smoothness. Likewise, the axially outward face 56 of the annular flange portion 50 and the face 58 of the hub 36 surrounding the seat pocket 36 may be also finished. By so finishing these surfaces, a metal-to-metal seal will be obtained from the mettal-to-metal contact of the gate 24 against the face 54 of the annular flange portion 50 and the corresponding contact of the axially outward face 56 of the annular flange portion 50 against the face 58 of the hub portion 34. In order to obtain such a seal, the flange portion 50 must be proportioned so as to obtain a sufficiently high bearing pressure between the surface of the gate 24 and face 54 and face 56 and face 58 so that a seal is established; however, the bearing pressure must be maintained within a range that will produce relatively low wear of the sealing face 54. While a metal-to-metal seal is so formed, the primary seal is formed by the resilient material. However, in the event of loss of the resilient material, the metal-to-metal seal just described will provide an adequate downstream seal. As hereinbefore used and hereinafter used in the specification and claims, the term "resilient material" means a body of plastic material which flows under pressure with relatively great resistance to the internal bond between particles and which acts in the manner of a fluid in the transmission of pressure. Included within such terminology are the natural or synthetic rubbers and various plastic elastomers which will perform such function. The mass 44 of resilient material forming the sealing face of the sealing member 10 is relatively hard and abrasive resistant and accordingly will resist wear. The mass 46 on the axially outward face of the sealing member is relatively soft and easily flowable to act more as a true hydraulic mass. The mass 46 is used to rejuventate the mass 44 as normal wear causes it to diminish in size. To receive the resilient material, the sealing face of the structural member 42 is provided with an annular groove 58 and the general cylindrical portion 48 is provied with a multiplicity of axially extending apertures 60 which connect with the annular groove 58. As can be noted from Figs. 5 and 6, there are no apertures in the bottom portion of the structural member 42, the purpose of which will be explained subsequently. The mass 44 of tough abrasive resistant resilient material is located in the annular groove 58 and is provided with an annular raised portion 62 which extends above the sealing face 54 of annular portion 50. The raised portion 62 is the part of the resilient material which forms the actual sealing contact with the face of the valve member 24. The mass 46 of soft, pliable, resilient material is located in the apertures 60 and terminates in the axial outward face of the sealing member as slight bulges protruding from apertures 60. The masses 44 and 46 of resilient material are bonded to the structural member 42 as shown by the *xxx*'s in Fig. 7. As can be seen, the soft mass 46 is not bonded and extends past the axial outward end of the sealing member 10 therefor mass 46 is free to move through the apertures 60 to rejuvenate the mass 44. Various experiments have shown that the rejuvenation by the unbonded soft mass 46 will materially extend the life of the sealing member 10 over a sealing member not having such rejuvenation feature. As repeated operation of the valve wears down the annular raised portion 62 of the resilient material 44, the resilient material 46 will be forced through the apertures 60 rejuvenating the mass 44. On the upstream side this will result from the line pressure activating the mass 44. On the downstream side will result from the sealing member 10 being forced back into its pocket 36 and exerting a pressure on the portion of the mass 46 which extends past the axially outward end of the structural member 42. As can be seen, the wall of the passage 52 is part of the structural member and affords an intimate contact with the gate which will wipe or scrape any deleterious matter in the lading away from the resilient material thereby protecting the resilient material from being damaged.

As can be seen in Figs. 2, 6 and 7, the outer circumferential edge of the axially outward face of the cylindrical portion 48 is chamfered and a knobular portion 64 of resilient material is secured to such chamfered corner. The knobular portion 64 is diametrically greater than the cylindrical wall 38 and by its interference with the cylindrical wall 38 of the pocket 36 a seal is effected between the sealing member 10 and the pocket 36. Therefore, if on the upstream side any pressure exists between the axially outward wall 40 of the pocket and the axially outward face of the sealing member 10, such pressure will be transmitted to the sealing member 10 forcing the sealing member 10 toward the gate 24. This movement forces the annular raised portion 62 into intimate contact with the face of the valve member 24 and establishes a seal around the upstream passage. To prevent sediment in the lading from settling between the axially outward wall of the sealing member 10 and the axial outward wall 40 of the pocket 36, the inner circumferential edge of the axially outward face of the structural member 42 is chamfered and a triangular portion 66 of resilient material is secured thereto. The triangular portion 66 acts as a shield and prevents any sediment from getting into the area between the axially outward face of the sealing member 10 and the wall 40 of the pocket which in time would build up and prevent the sealing member from properly functioning. To permit pressure to get into this area, a notch 68 is located at the top of the triangular portion 66. The axial length of the triangular portion 66 is such that it will not lose contact with the axially outward wall 40 of the pocket when the upstream sealing member 10 is moved toward the gate 24 by the line pressure that acts on the sealing member.

As previously mentioned, there are no apertures 60 in the lower quadrant of the sealing member. In operating the valve, the lower quadrant is the portion of the sealing member that is first exposed when opening the valve and therefore subjected to the first initial pressure; also, in closing the valve it is the last part exposed. It was found that in the larger size high pressure valves that the resilient material in such area was being destroyed. Such destruction resulted either from the resilient material being blown out or being pushed out and then cut off by the gate on closing. By eliminating the communication between the masses 44 and 46—apertures 60—such destruction was eliminated. It was found that there was still some feeding from the resilient material around the remainder of the periphery. Inasmuch as the sealing member 10 is loose in the pocket 36, the seating member rotates. Since it was found that the bottom portion would be damaged if the communication between the masses 44 and 46 was not eliminated, it was necessary to orient the sealing member and make it non-rotative. To accomplish this, the annular flange portion 50 of each sealing member 10 is provided with a pair of ears 70—70 which contact the side walls of the valve chamber and prevent rotation.

The action of the resilient sealing member 10 under various conditions is shown in Figs. 2, 3 and 4. In all figures, the left hand side "conduit 16" is upstream. Fig. 2 shows the gate in the closed position and shows the primary seal formed by the annular raised portion 62 of tough, firm, resilient material on the face of each seat. Also, it shows the seal formed around the pocket by the knobular portion 64. As can be seen, the gate 24 is centered between the two seat members 10—10 and the seals established are the original seals formed by the interference of the various parts.

As a pressurized valve is closed, line pressure in the upstream side and body, Fig. 3, moves the gate toward the downstream side 18 forcing the downstream sealing member 10 into its pocket 36 leaving pressure balanced across the upstream seat. Such action compresses the knobular portion 64. As in Fig. 2, the knobular portion 64 seals between the sealing member 10 and pocket 36. The downstream side of the gate 24 is in intimate contact with the annular raised portion 62 establishing a seal around the passage 52 of the sealing member 10. If the pressure in the valve chamber 22 is bled off, a seal will be established on the upstream side as well as the downstream side. This seal on the upstream side results from the upstream pressure flowing between the axially outward wall of the upstream sealing member 10 and the wall 40 of the pocket 36. Since the knobular portion 64 establishes a seal between the sealing member 10 and pocket 36, the upstream pressure forces the sealing member 10 into more intimate contact with the upstream face of the gate 24 consequently establishing a more intimate contact between the raised annular portion 62 of the upstream sealing member 10 and upstream side of the gate 24. The establishment of the upstream seal permits the valve to be used for block and bleed service and also permits the pressure in the valve chamber to be bled off and the bonnet to be removed in either the completely open or completely closed position.

The sealing member 10 is so designed that if the pressure in the valve chamber builds up over a predetermined designed limit, the upstream sealing member 10 will permit the excess pressure to be discharged into the upstream flow passage, see Fig. 4. This upstream relief is achieved by the pressure in the valve chamber forcing the upstream sealing member 10 further into its pocket and breaking the contact between the raised annular portion 62 and the upstream side of the gate 24. As soon as the excess pressure is relieved, the valve will return to the condition shown in Fig. 3.

An alternate form of sealing member is shown in Fig. 8. The sealing member 80 will perform all of the functions of the member 10. Similar to the sealing member 10, sealing member 80 has a structural member 82 which has a hub portion 84 and load bearing flange portion 86 and two masses 88—90 of resilient material. Apertures 92 provide communication between the masses 88 and 90. As in the sealing member 10, the faces of the flange portion 86 may be finished to provide a metal-to-metal seal. Instead of the separate knobular portion 56, the axially outer circumferential edge of the soft mass 90 terminates in a knobular portion 94. In such form, when the sealing member 80 is on the downstream side the soft mass 90 will feed not only by compression into the pocket, but also by line pressure coming around the circumferential edge of the hub portion 84 and energizing the soft mass 90.

As can be seen from the above, the present invention is directed to an economical high strength pressure-activated sealing member for a valve. The sealing members 10 and 80 have structural members which can be economically formed in any quantity, large or small, from high strength, load carrying materials. The structural members have sufficient mass and strength to withstand the higher loads of large size high pressure valves. The line pressure loads are carried by an annular flange portion so designed that the faces may be finished to provide for a metal-to-metal seal and yet not wear excessively. The structural member has a portion which forms a portion of the run of the valve thereby protecting the resilient material from the deleterious matter in the lading. Since in large size high pressure valves the wear is greater in the lower quadrant, the sealing member is designed to prevent through feeding in such section and is also provided with means to retain the sealing member relatively non-rotative. To prevent sediment from falling out between the axially outward wall of the seat and pocket a shielding means is provided. The sealing member is self-compensating for wear, easy to assemble into a valve, pressure acting to provide upstream seal and relieves excessive body pressure.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

We claim:

1. A sealing member for a valve comprising: a generally annular structural member formed of a cylindrical hub portion having an axial passage therethrough and an annular flange portion encircling one end of the hub portion, the flange end of the hub portion provided with an annular groove spaced from and surrounding the passage, a plurality of apertures extending axially through the hub portion, one end of said apertures being in communication with the annular groove, a mass of hard abrasive resistant resilient material secured in the annular groove, the mass of resilient material having an annular raised portion extending above the plane of the annular flange portion, a mass of soft pliable resilient material positioned in the plurality of apertures, said soft mass extending past the end of the hub portion, a mass of resilient material extending above the plane of the circumferential surface of the cylindrical hub portion.

2. The sealing member specified in claim 1 characterized in that there is a mass of resilient material secured to the inner circumferential surface of the passage on the end opposite the flange portion.

3. A sealing member for a valve comprising: a generally annular structural member formed of a cylindrical hub portion having an axial passage therethrough and an annular flange portion encircling one end of the hub portion, the flanged end of the hub portion provided with an annular groove spaced from and surrounding the passage, a plurality of apertures extending through the hub portion around approximately three quarters of the circumference of said hub portion, one end of said apertures being in communication with the annular groove, a mass of hard abrasive resistant resilient material secured in the annular groove, the mass of resilient material having an annular raised portion extending above the plane of the annular flange portion, a mass of soft pliable resilient material positioned in the plurality of apertures, said soft mass extending past the end of the hub portion, the outer circumferential edge of the hub portion being chamfered, a mass of resilient material secured thereto, said portion being diametrically greater than the cylindrical hub portion.

4. A sealing member for a valve comprising: a generally annular structural member formed of a cylindrical hub portion having an axial passage therethrough and an annular flange portion encircling one end of the hub portion, the flanged end of the hub portion provided with an annular groove spaced from and surrounding the passage, a plurality of apertures extending through the hub portion around approximately three quarters of the circumference of said hub portion, one end of said apertures being in communication with the annular groove, a mass of hard abrasive resistant resilient material secured in the annular groove, the mass of resilient material having an annular raised portion extending above the plane of the annular flange portion, a mass of soft pliable resilient material positioned in the plurality of apertures, said soft mass extending past the end of the hub portion, outer circumferential surface of the soft pliable mass terminating in a knobular portion extending above the plane of the circumferential surface of the cylindrical hub portion.

5. A sealing member for a valve comprising: a generally annular structural member formed of a cylindrical hub portion having a passage therethrough and an annular flange portion encircling one end of the hub portion, the flanged end of the hub portion provided with an annular groove spaced from and surrounding the passage, a plurality of apertures extending through the hub portion, one end of said apertures being in communication with the annular groove, a mass of hard abrasive resistant resilient material secured in the annular groove, the mass of resilient material having an annular raised portion extending above the plane of the annular flange portion, a mass of soft pliable resilient material positioned in the plurality of apertures, said soft mass extending past the end of the hub portion, the outer circumferential edge of the hub portion being chamfered, a third mass of resilient material secured thereto, said third mass being diametrically greater than the cylindrical hub portion, the circumferential edge of the passage opposite the flange portion being chamfered and a fourth mass of resilient material secured thereto, said fourth mass extending axially past the end of the hub portion.

6. In a valve structure, a housing having a flow passage therethrough and a chamber for a valve closure member intersecting said passage, a valve member in said chamber, at least one pocket in the wall of the housing concentric with said passage and a sealing member, said sealing member located in said pocket, said sealing member comprising a structural member having a cylindrical hub portion extending into said pocket provided with a passage aligned with the flow passage, the cylindrical portion being slightly diametrically smaller than the pocket, and an annular flange portion encircling the hub portion, said flange portion opposing the wall surrounding the pocket, the face of said cylindrical hub portion opposing the valve member provided with an annular groove surrounding the passage in said cylindrical hub portion, a plurality of apertures extending through the cylindrical hub portion, one end of said apertures being in communication with said annular groove, a mass of hard abrasive resistant resilient material secured in said annular groove, said mass having an annular raised portion extending above the plane of the annular flange portion, a mass of soft pliable resilient material positioned in the plurality of apertures, said soft mass extending past the axially outward end of the hub portion, means establishing a seal between the pocket and cylindrical hub portion.

7. In a valve structure, a housing having a flow passage therethrough and a chamber for a valve closure member intersecting said passage, a valve member in said chamber having a passage aligned with the flow passage in the valve open position and a portion blocking flow in the valve closed position, at least one pocket in the wall of the housing concentric with said passage and a sealing member, said sealing member located in said pocket, said sealing member comprising a structural member having a cylindrical hub portion extending into said pocket provided with a passage aligned with the flow passage, the cylindrical portion being slightly diametrically smaller than the pocket, and an annular flange portion encircling the hub portion, said flange portion opposing the wall surrounding the pocket, said flange portion provided with means to prevent rotation of the structural member, the face of said cylindrical hub portion opposing the valve member provided with an annular groove surrounding the passage in said cylindrical hub portion, a plurality of apertures extending through the cylindrical hub portion around approximately three quarters of the circumference of said hub portion, the unapertured portion of said hub being in the bottom quarter, one end of the said apertures being in communication with said annular groove, a first mass of resilient material secured in said annular groove, said mass having an annular raised portion extending above the plane of the annular flange portion, a second mass of resilient material positioned in the plurality of apertures, said second mass extending past the axially outward end of the hub portion, means establishing a seal between the pocket and cylindrical hub portion.

8. In a valve structure, a housing having a flow passage therethrough and a chamber for a valve closure member intersecting said passage, a valve closure member in said chamber, pockets in the wall of the housing concentric with said passage, said pockets having one side open to the passage and two sealing members, a sealing member positioned in each pocket, each sealing member comprising a structural member having a cylindrical hub portion extending into its respective pocket provided with a passage aligned with the flow passage, the cylindrical portion being slightly diametrically smaller than the pocket, and an annular flange portion encircling the hub portion, said flange portion opposing the wall surrounding the pocket, the face of said cylindrical hub portion opposing the valve member provided with an annular groove surrounding the passage in said cylindrical hub portion, a plurality of apertures extending through the cylindrical hub portion, one end of said apertures being in communication with said annular groove, a mass of hard abrasive resistant resilient material secured in said annular groove, said mass having an annular raised portion extending above the plane of the annular flange portion, a mass of soft pliable resilient material positioned in the plurality of apertures, said soft mass extending past the axially outward end of the hub portion, means establishing a seal between the pocket and cylindrical hub portion.

9. In a valve structure, a housing having a flow passage therethrough and a chamber for a valve closure member intersecting said passage, a valve closure member in said chamber having a passage aligned with the flow passage in the valve open position and a portion blocking flow in the valve closed position, pockets in the wall of the housing concentric with said passage, said pockets having one side open to the passage and two sealing members, a sealing member positioned in each pocket, each sealing member comprising a structural member having a cylindrical hub portion extending into its respective pocket provided with a passage aligned with the flow passage, the cylindrical portion being slightly diametrically smaller than the pocket, and an annular flange portion encircling the hub portion, said flange portion opposing the wall surrounding the pocket, said flange portion provided with means to prevent rotation of said structural member, the face of said cylindrical hub portion opposing the valve member provided with an annular groove surrounding the passage in said cylindrical hub portion, a plurality of apertures extending through the cylindrical hub portion around the upper three quarters of said cylindrical portion, one end of said apertures being in communication with said annular groove, a mass of hard abrasive resistant resilient material secured in said annular groove, said mass having an annular raised portion extending above the plane of the annular flange portion, a mass of soft pliable resilient material positioned in the plurality of apertures, said soft mass extending past the axially outward end of the hub portion, means establishing a seal between the pocket and cylindrical hub portion.

10. In a valve structure, a housing having a flow passage therethrough and a chamber for a valve closure member intersecting said passage, a valve closure member in said chamber having a passage aligned with the flow passage in the valve open position and a portion blocking flow in the valve closed position, pockets in the wall of the housing concentric with said passage, said pockets having one side open to the passage and two sealing members, a sealing member positioned in each pocket, each sealing member comprising a structural member having a cylindrical hub portion extending into its respective pocket provided with a passage aligned with the flow passage, the cylindrical portion being slightly diametrically smaller than the pocket, and an annular flange portion encircling the hub portion, said flange portion opposing the wall surrounding the pocket, said flange portion provided with means to prevent rotation of said structural member, the face of said cylindrical hub portion opposing the valve member provided with an annular groove surrounding the passage in said cylindrical hub portion, a plurality of apertures extending through the cylindrical hub portion around the upper three quarters of said cylindrical portion, one end of said apertures being in communication with said annular groove, a mass of hard abrasive resistant resilient material secured in said annular groove, said mass having an annular raised portion extending above the plane of the annular flange portion, a mass of soft pliable resilient material positioned in the plurality of apertures, said soft mass extending past the axially outward end of the hub portion, means establishing a seal between the pocket and cylindrical hub portion, means secured to the wall of the passage to act as a shield and prevent sediment from getting between sealing member and pocket, but allowing pressure to enter.

11. In a valve structure, a housing having a flow passage therethrough and a chamber for a valve closure member intersecting said passage, a valve member in said chamber, at least one pocket in the wall of the housing concentric with said passage and a sealing member, said sealing member located in said pocket, said sealing member comprising a structural member having a cylindrical hub portion extending into said pocket provided with a passage aligned with the flow passage, the cylindrical portion being slightly diametrically smaller than the pocket, and an annular flange portion encircling the hub portion, said flange portion opposing the wall surrounding the pocket, the face of said valve closure member, faces of said annular flange portion and face of said wall finished to establish a metal-to-metal seal between said surfaces, the face of said cylindrical hub portion opposing the valve member provided with an annular groove surrounding the passage in said cylindrical hub portion, a plurality of apertures extending through the cylindrical hub portion, one end of said apertures being in communication with said annular groove, a first mass of resilient material secured in said annular groove, said mass having an annular raised portion extending above the plane of the annular flange portion, a second mass of resilient material positioned in the plurality of apertures, said second mass extending past the axially outward end of the hub portion, means establishing a seal between the pocket and cylindrical hub portion.

12. In a valve structure, a housing having a flow passage therethrough and a chamber for a valve closure member intersecting said passage, a valve closure member in said chamber, pockets in the wall of the housing concentric with said passage, said pockets having one side open to the passage and two sealing members, a sealing member positioned in each pocket, each sealing member comprising a structural member having a cylindrical hub portion extending into its respective pocket provided with a passage aligned with the flow passage, the cylindrical portion being slightly diametrically smaller than the pocket, and an annular flange portion encircling the hub portion, said flange portion opposing the wall surrounding the pocket, the face of said cylindrical hub portion opposing the valve member provided with an annular groove surrounding the passage in said cylindrical hub portion, a plurality of apertures extending through the cylindrical hub portion, one end of said apertures being in communication with said annular groove, a mass of hard abrasive resistant resilient material secured in said annular groove, said mass having an annular raised portion extending above the plane of the annular flange portion, a mass of soft pliable resilient material positioned in the plurality of apertures, said soft mass extending past the axially outward end of the hub portion, a third mass of resilient material secured to the cylindrical wall of the cylindrical hub portion establishing a seal between the pocket and cylindrical hub portion, a fourth mass of resilient material secured to wall of the passage establishing a shield between the sealing member and pocket to prevent intrusion of foreign matter and means in said fourth mass to permit the entrance of pressure.

No references cited.